United States Patent
Yin

(10) Patent No.: US 9,525,449 B2
(45) Date of Patent: Dec. 20, 2016

(54) REDUCTION OF ELECTROMAGNETIC (EM) RADIATION FROM A CLIENT DEVICE

(71) Applicant: Xuefeng Yin, Shanghai (CN)

(72) Inventor: Xuefeng Yin, Shanghai (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 128 days.

(21) Appl. No.: 14/390,624

(22) PCT Filed: Jun. 3, 2013

(86) PCT No.: PCT/CN2013/076634
§ 371 (c)(1),
(2) Date: Oct. 3, 2014

(87) PCT Pub. No.: WO2014/194455
PCT Pub. Date: Dec. 11, 2014

(65) Prior Publication Data
US 2016/0156377 A1    Jun. 2, 2016

(51) Int. Cl.
| H04B 1/38 | (2015.01) |
| H04M 1/00 | (2006.01) |
| H04B 1/3827 | (2015.01) |
| H04B 7/08 | (2006.01) |
| H04M 1/02 | (2006.01) |
| H04N 5/225 | (2006.01) |
| H04W 52/28 | (2009.01) |

(Continued)

(52) U.S. Cl.
CPC ............ *H04B 1/3838* (2013.01); *H04B 7/086* (2013.01); *H04M 1/0202* (2013.01); *H04N 5/225* (2013.01); *H04W 52/288* (2013.01)

(58) Field of Classification Search
CPC ....... H04B 1/3838; H04B 7/086; H04N 5/225; H04W 16/28; H01Q 1/245
USPC ..................... 455/63.4, 566, 575.5
See application file for complete search history.

(56) References Cited

U.S. PATENT DOCUMENTS

| 7,728,281 B2 | 6/2010 | Chen |
| 8,681,035 B2 | 3/2014 | Baharav et al. |

(Continued)

FOREIGN PATENT DOCUMENTS

| CN | 2706974 Y | 6/2005 |
| CN | 1779442 A | 5/2006 |

(Continued)

OTHER PUBLICATIONS

"HTD-MobIRM4—Infrared Thermal Imaging Miracle," accessed at http://www.hitechdevices.com/InfraredCamera/MobIRM4.htm, accessed on Jun. 16, 2014, pp. 1-3.

(Continued)

*Primary Examiner* — Ayodeji Ayotunde
(74) *Attorney, Agent, or Firm* — Brundidge & Stanger, P.C.

(57) ABSTRACT

In wireless communication, a camera on a mobile communication device may be activated to take photographs of the surroundings. The photographs may be further converted into infrared photographs. People near the mobile communication device may be identified on the infrared photographs. The EM radiation of the mobile communication device may then be adjusted to avoid the regions in which people are identified.

24 Claims, 6 Drawing Sheets

(51) Int. Cl.
*H04B 1/00* (2006.01)
*H04B 15/00* (2006.01)

(56) References Cited

U.S. PATENT DOCUMENTS

2010/0279616 A1* 11/2010 Jin .................. H04W 16/28
455/62
2012/0211656 A1 8/2012 Katz et al.
2013/0328723 A1* 12/2013 Rappaport ........... H04B 1/3838
342/372

FOREIGN PATENT DOCUMENTS

| | | |
|---|---|---|
| CN | 200950262 Y | 9/2007 |
| CN | 101980519 A | 2/2011 |
| CN | 102594999 A | 7/2012 |
| EP | 2282497 A2 | 2/2011 |
| JP | 2002152116 A | 5/2002 |
| KR | 200100004576 A | 1/2001 |

OTHER PUBLICATIONS

"Infrared Photo Editor," accessed at http://web.archive.org/web/20121030004118/http://www.tequnique.com/wb/pages/products/infrared-photo-editor.php, accessed on Jun. 16, 2014, pp. 1-3.

Bartlett, M., "Smoothing Periodograms from Time-Series with Continuous Spectra," Nature, vol. 161, pp. 686-687 (1948).

Capon, J., "High-resolution frequency-wavenumber spectrum analysis," Proceedings of the IEEE, vol. 57, issue 8, pp. 1408-1418 (1969).

Dusto, A., "Mobile Infrared Camera Provides energy Snapshots of City," accessed at http://web.archive.org/web/20121110002153/http://news.discovery.com/tech/mobile-infrared-camera-provides-energy-snapshots-of-city-110318.html, Mar. 18, 2011, pp. 1-6.

Elko, G. W. and Pong, A-T. N., "A Simple Adaptive First-Order Differential Microphone," IEEE ASSP Workshop on Applications of Signal Processing to Audio and Acoustics, pp. 169-172 (1995).

International Search Report with Written Opinion for International Report for International Application No. PCT/CN2013/076634 mailed on Mar. 13, 2014.

Marcos, S., et al., "Performances analysis of the propagator method for source bearing estimation," Proceedings of IEEE International Conference on Acoustics, Speech and Signal Processing, vol. 4, pp. 237-240 (1994).

Mathew, D., "Bluetooth and Infrared in Mobile Phones," accessed at http://ezinearticles.com/?Bluetooth-And-Infrared-In-Mobile-Phones&id=738059, Sep. 19, 2007, pp. 1-2.

Stoica, P. and Nehorai, A., "Music, maximum likelihood, and Cramer-Rao bound," Acoustics, Speech and Signal Processing, vol. 37, issue 5, pp. 720-741 (1989).

* cited by examiner

REDUCTION OF ELECTROMAGNETIC (EM) RADIATION FROM A CLIENT DEVICE

CROSS-REFERENCE TO RELATED APPLICATION

The present application is a U.S. national stage filing under 35 U.S.C. §371 of International Application No. PCT/CN13/76634, filed on Jun. 3, 2013.

TECHNICAL FIELD

The embodiments described herein pertain generally to the reduction of electromagnetic (EM) radiation from client devices.

BACKGROUND

Unless otherwise indicated herein, the approaches described in this section are not prior art to the claims in this application and are not admitted to be prior art by inclusion in this section.

When a user utilizes a wireless communication device, electromagnetic (EM) waves are used as carriers of information between a base station and the wireless communication device. In many cases, radiation emanating from EM waves may cover people around the wireless communication device, which may cause harm to the health of the people. Further, with regard to performance, as the people within the radiation range of the wireless communication device may absorb significant portions of the EM waves, performance of the wireless communication device may be compromised.

SUMMARY

Technologies are generally described for reducing EM radiation on people. The various techniques may be implemented in various systems, methods, and/or computer-readable mediums.

In some examples, various techniques may be implemented as methods. Some methods may include activating a camera on a mobile communication device to capture a digital photograph of an area, analyzing the digital photograph to identify a presence of one or more people in the area, determining one or more regions in the area in which the presence of one or more people is identified, calculating a plurality of weighting coefficients used to determine an electromagnetic (EM) radiation pattern of a multi-element antenna array to avoid EM radiation being directed toward the one or more regions during signal transmission, and transmitting wireless signals by radiating towards the area in the EM radiation pattern using the weighting coefficients.

Some other methods may include obtaining data representative of an image of an area, identifying one or more regions in the area, computing an electromagnetic (EM) radiation pattern of a multi-element antenna array to avoid EM radiation from being directed toward the identified one or more regions during signal transmission, and radiating wireless signals in the computed EM radiation pattern.

In some examples, various techniques may be implemented as mobile communication devices. Some mobile communication devices may include a casing having a back side and a front side opposite to the back side; a camera exposed on the back side of the casing; a user interface unit having an interface for receiving user input and output on the front side of the casing; a wireless communication component configured to wirelessly receive and transmit signals; a memory, disposed in the casing, configured to store a set of instructions; and a processor disposed in the casing and coupled to the camera, the user interface unit and the wireless communication component. The processor may be configured to activate the camera to capture a digital photograph of an area facing the back side of the casing, and to activate the wireless communication component to transmit wireless signals by radiating out of the back side of the casing in an electromagnetic (EM) pattern such that no EM radiation is directed toward people located in the area.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
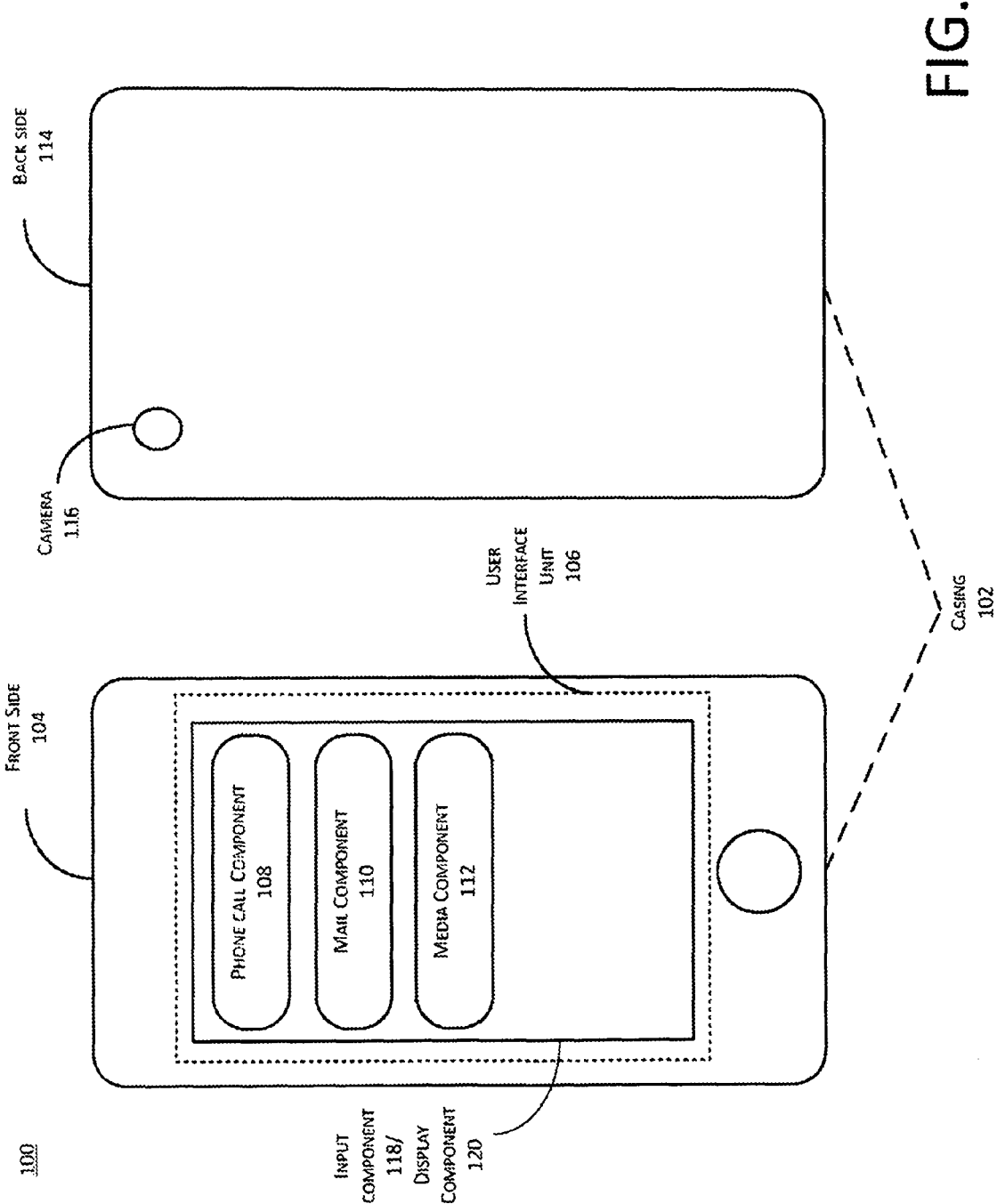
FIG. 1 shows an example mobile communication device by which reduction of EM radiation from a client device may be implemented, arranged in accordance with at least some embodiments described herein.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example mobile communication device 100 by which reduction of EM radiation from a client device may be implemented, arranged in accordance with at least some embodiments described herein. As depicted, the example mobile communication device 100 may include, at least, a casing 102 that includes a front side 104, a back side 114, a user interface unit 106, and a camera 116. User interface unit 106 may, at least, include one or more interactive components, e.g., a phone call component 108, a mail component 110, a media component 112, etc. The one or more interactive components may be shown on user interface unit 106 as "phone call," "mail," "media," etc.

As referenced herein, "media" may include both audio and/or video data.

Communication device 100 may refer to a mobile (or portable) electronic device such as a mobile phone, smartphone, personal digital assistant (PDA) a personal media player device, an application specific device, or a hybrid device that includes any of the above functions. Alternatively, communication device 100 may be implemented as a personal computer including tablet, laptop computer, non-laptop computer configure configurations, etc. Regardless, communication device 100 may be configured to receive and transmit EM waves that carry wireless signals during communication.

As referenced herein, "communication" may refer to any exchange of data or information that includes phone calls, SMS texts, media streaming, etc.

Casing 102 may refer to an enclosing shell, or surrounding material, that may be configured to house one or more hardware components of mobile communication device 100. Casing 102 may be made of materials including plastic, silicon, metal, leather, glass, etc. Generally, casing 102 may be provided to protect the hardware components from being damaged after being dropped, exposed to water, exposed to static electricity, etc. In accordance with some examples, casing 102 may be configured to include one or more openings for one or more of the hardware components, e.g., camera 116, to perform communication tasks properly.

Front side 104 may refer to a surface of casing 102 that faces a user of mobile communication device 100 when the user operates, or utilizes, mobile communication device 100 in an interactive manner. In accordance with some examples, front side 104 may have one or more features integrated thereon, which may include user interface unit 106, a home button, a power button, a microphone, etc.

User interface unit 106 may refer to an interface that may be configured to display content for the user and to receive interactive input from the user. In accordance with some examples, user interface unit 106 may include input component 118 and display component 120.

Input component 118 may refer to a keyboard or a touch screen integrated with display component 120 as showed in FIG. 1. The keyboard may alternatively be attached to mobile communication device 100 via a USB connection or short-range communication link, e.g., Bluetooth, radio frequency (RF), infrared (IR) connection, etc.

Display component 120 may refer to a thin film display unit, e.g., liquid crystal display (LCD), light-emitting diode (LED), Organic Light Emitting Diode (OLED), etc.

Phone call component 108, mail component 110, and media component 112 may refer to examples of interactive components integrated in user interface unit 106 that may be configured to receive interactive input from the user in order to provide communication or media services to the user, via mobile communication device 100. That is, by interacting with one or more of the respective interactive components, the user may be able to conduct phone calls, receive and/or send emails, receive and/or send text messages, play music, stream video files, play video games, etc. As an example of such interaction, phone call component 108, shown as an icon on a touch screen of user interface unit 106, may initiate or answer a phone call when tapped by the user.

Back side 114 may refer to a surface of casing 102 that is opposite to front side 104. In accordance with some examples, back side 114 may be configured to have one or more openings for a lens of camera 116 and, optionally, a flash (not shown).

Camera 116 may refer to a hardware component that may be configured to record, or capture, still and/or moving images, such as digital photographs or videos. In some examples, camera 116 may be configured to record, or capture, infrared photographs and/or moving images. Further, camera 116 may be configured to transmit the still and/or moving images to a processor (not shown) of mobile communication device 100.

In accordance with some example embodiments, camera 116 may be activated to capture photographs of the surroundings of the user when at least one of preset conditions is met. The preset conditions may include, at least, mobile communication device 100 initiating an outbound wireless transmission or receiving an inbound wireless transmission via wireless communication component 202; when wireless communication signal strength falls below a predetermined threshold value, which may indicate the people near wireless communication device 100 may absorb EM waves and, thus, cause the degradation of wireless communication signal strength; mobile communication device 100 acknowledging the degradation in the communication channel; mobile communication device 110 connecting to a wireless transmission hot spot; and/or mobile communication device 110 being in an indoor environment.

The captured images and/or videos, if they are not captured as infrared media, may be transmitted to the processor of mobile communication device 100 that may further convert the captured images and/or videos into infrared media. The processor may be configured to detect the presence of people near the user, based on the infrared media, and to further adjust the EM radiation pattern to avoid directing the EM radiation toward the people.

Thus, FIG. 1 shows an example mobile communication device 100 that may include a casing having a back side 114 and a front side 104 opposite to back side 114; a camera 116 exposed on back side 114 of the casing; a user interface unit 106 having an interface for receiving user input and output on front side 104 of the casing.

Figure 2:
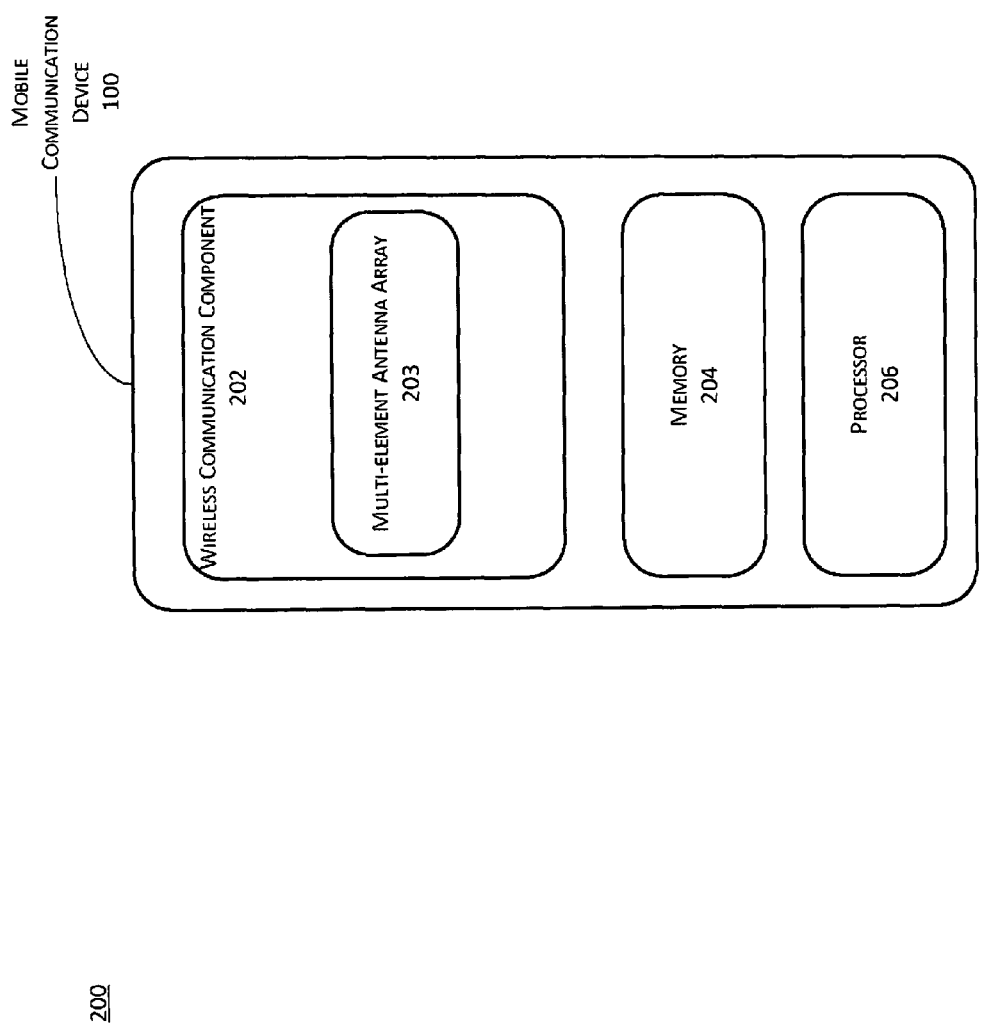
FIG. 2 shows some additional example components integrated in the example mobile communication device by which reduction of EM radiation from a client device may be implemented, arranged in accordance with at least some embodiments described herein.

FIG. 2 shows some additional example components integrated in the example mobile communication device by which reduction of EM radiation from a client device may be implemented, arranged in accordance with at least some embodiments described herein. As depicted, mobile communication device 100 may, at least, include a wireless communication component 202, a memory 204, and a processor 206.

Wireless communication component 202 may refer to a hardware component that may be configured to transmit and receive EM waves that carry wireless signals for the communication between mobile communication device 100 and other devices. As such EM waves are transmitted from wireless communication component 202, i.e., mobile communication device 100, radiation emanating from the EM waves may be absorbed by people near mobile communication device 100. As set forth above, such absorption of the EM waves, and corresponding radiation, by people nearby mobile communication device 100 may cause various health risks for those people and even compromise performance of mobile communication device 100.

In accordance with some examples, wireless communication component 202 may include a multi-element antenna array 203 that may be configured to adopt a beamforming technique, or a null-forming technique, in order to direct emanating EM waves toward one or more preferred directions and/or to avoid other directions. The beamforming technique, or a null-forming technique, implemented by multi-element antenna array 203 may refer to a signal processing technique, for directional reception or transmission, that combines the multi-elements of the antenna array so that wireless signals at preferred angles may experience constructive interference while other wireless signals at less preferred angles may experience destructive interference. Each element of the multi-element antenna array 203 may be assigned, by processor 206, with a weight coefficient that may assign the parameters of the wireless signals, e.g., phase, amplitude, etc., transmitted from the respective elements so that the overall EM radiation may be directionally controllable. Thus, the wireless signals transmitted from mobile communication device 100 may experience constructive interference, e.g., signal strength may be amplified, in one or more preferred directions and destructive interference, e.g., signal strength may be weakened, in one or more undesirable directions.

Memory 204 may refer to a hardware component disposed in casing 102 that may be configured to store, e.g., the captured still and/or moving images received from camera 116, a set of instructions for adjusting wireless communication component 202, and/or processing the captured still and/or moving images.

Processor 206 may refer to a hardware component disposed in casing 102 that may be configured, at least, to activate camera 116 and to adjust wireless communication component 202. In accordance with one or more example embodiments, processor 206 may be communicatively coupled to camera 116, wireless communication component 202, and user interface unit 106. Thus, processor 206 may be configured to activate camera 116 to capture one or more still and/or moving images of one or more subjects in an area facing back side 114 of mobile communication device 100 when at least one of a plurality of preset conditions is met. The preset conditions may include, at least, mobile communication device 100 initiating an outbound wireless transmission or receiving an inbound wireless transmission via wireless communication component 202; when wireless communication signal strength falls below a predetermined threshold value, which may indicate the people near wireless communication device 100 may absorb EM waves and, thus, cause the degradation of wireless communication signal strength; mobile communication device 100 acknowledging the degradation in the communication channel; mobile communication device 110 connecting to a wireless transmission hot spot; and/or mobile communication device 110 being in an indoor environment.

Upon receiving the one or more captured still and/or moving images, processor 206 may be configured to detect a presence of people near mobile communication device 100. In accordance with some examples, processor 206 may be configured to convert the captured still and/or moving images into one or more panorama infrared images that may depict a thermal image of any people and/or objects in the captured still and/or moving images. Further, since humans are warm-blooded, the presence of people in the captured still and/or moving images may be detected the surrounding environment in the converted thermal image. Processor 206 may be configured to determine one or more regions in the surroundings in which the presence of one or more people is detected.

Processor 206 may then be configured to determine an EM radiation pattern of the multi-elements antenna array of wireless communication component 202. To determine the EM radiation pattern, processor 206 may be configured to calculate a plurality of adjustable weighting coefficients by using a null-forming technique or a combination of null-forming and beamforming techniques. The null-forming technique may include a Bartlett beamformer technique, a Capon beamformer technique, a Multiple Signal Classification (MUSIC) technique, a Propagator technique, or variations or combinations thereof. By adjusting the weight coefficients, processor 206 may control the EM radiation direction to avoid people that a detected to be near mobile communication device 100 to reduce the overall transmission power of wireless communication component 202 and, thus, to reduce the power consumption of mobile communication device 100. Further, the reduced transmission power may cause less influence on the health of the user of mobile communication device 100. In some examples, in order to improve the communication quality, processor 206 may activate wireless communication component 202 to transmit the wireless signals at an increased level of power relative to a level of power at which signals are transmitted.

Thus, FIG. 2 shows some additional example components integrated in the example mobile communication device that may include a wireless communication component 202 configured to wirelessly receive and transmit signals; a memory 204, disposed in the casing, configured to store a set of instructions; and a processor 206 disposed in the casing and coupled to camera 116, user interface unit 106 and wireless communication component 202. Processor 206 may be configured to activate camera 116 to capture a digital photograph of an area facing back side 114 of the casing, and to activate wireless communication component 202 to transmit wireless signals by radiating out of back side 114 of the casing in an electromagnetic (EM) pattern such that no EM radiation is directed toward people located in the area.

Figure 3:
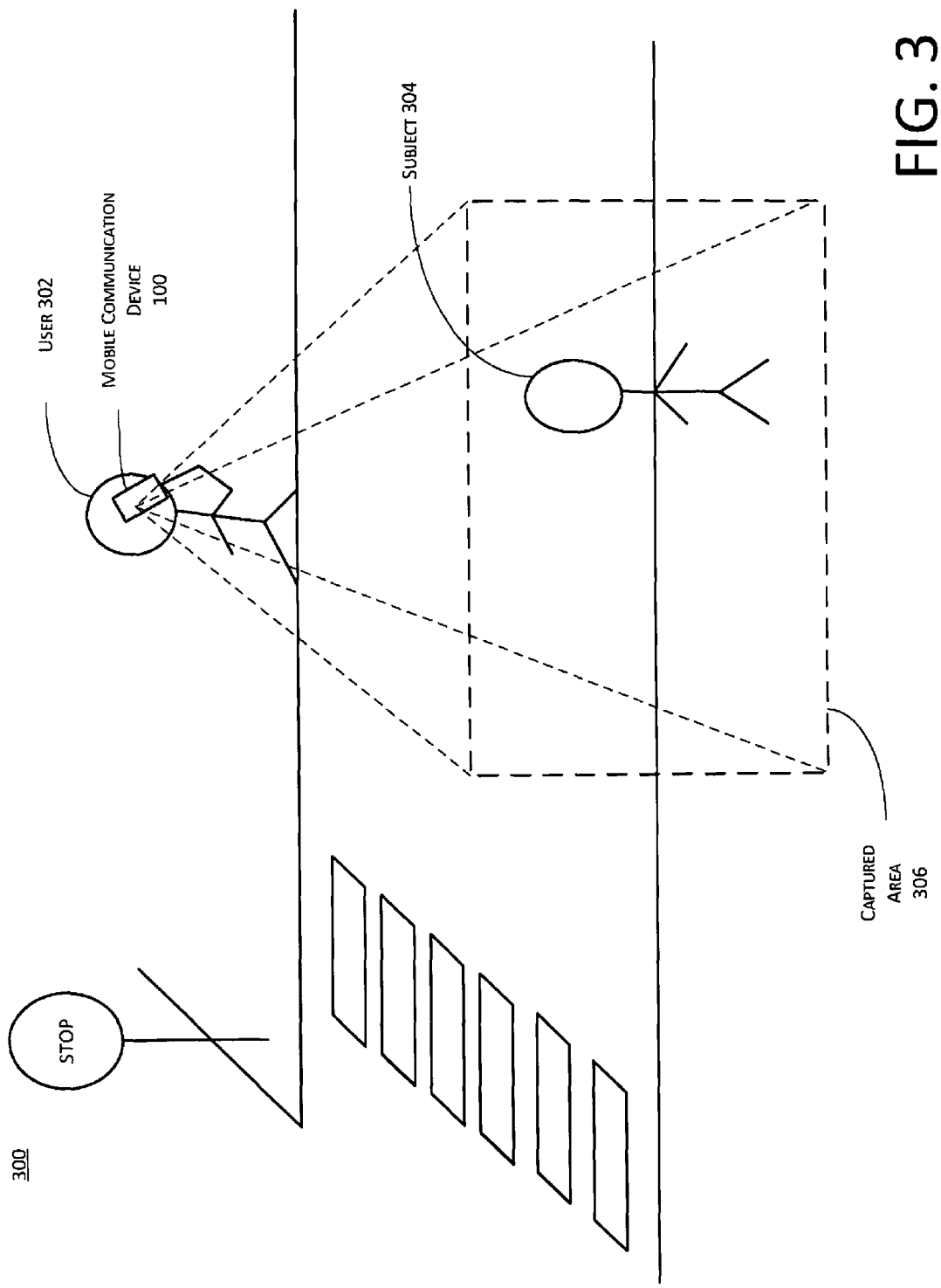
FIG. 3 shows an example environment in which reduction of EM radiation from a client device may be implemented, arranged in accordance with at least some embodiments described herein.

FIG. 3 shows an example environment 300 in which reduction of EM radiation from a client device may be implemented, arranged in accordance with at least some embodiments described herein. As depicted, example environment 300 may include a user 302, a subject 304, and a captured area 306.

User 302 may refer to any person that exercises control over mobile communication device 100.

Subject 304 may refer to one or more persons who are located near user 302. More particularly, subject 304 may refer to one or more persons who are included in the still and/or moving images captured by camera 116 on mobile communication device 100.

Captured area 306 may refer to a physical space that is included in any of the one or more still and/or moving images captured by camera 116.

In example environment 300, camera 116 may be activated by processor 206 to capture one or more photographs of the surroundings. The captured still and/or moving images may be converted by processor 206 into one or more panoramic infrared images that depict captured area 306. Further, based on the average body temperature of people, one or more of subject 304 within captured area 306 may be distinguished from the environment and therefore detected by processor 206. Processor 206 may further be configured to adjust wireless communication component 202 to direct the wireless signals to avoid subject 304 for the purpose of reducing EM radiation toward subject 304.

Thus, FIG. 3 shows an example environment 300 in which user 302 may exercise control over mobile communication device 100 that is activated to avoid EM radiation toward subject 304 in captured area 306, arranged in accordance with at least some embodiments described herein.

Figure 4:
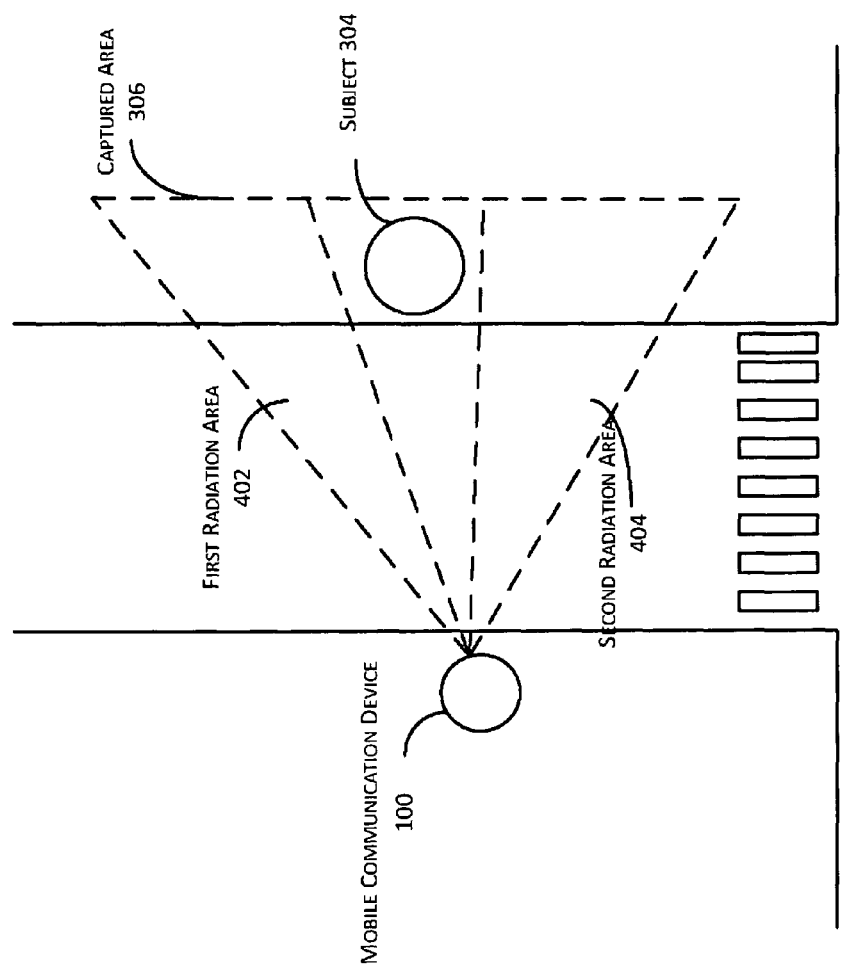
FIG. 4 shows an overhead view of the example environment in which reduction of EM radiation from a client device may be implemented, arranged in accordance with at least some embodiments described herein.

FIG. 4 shows an overhead view of the example environment in which reduction of EM radiation from a client device may be implemented, arranged in accordance with at least some embodiments described herein. As depicted, in addition to example environment 300, top view 400 may include a first radiation area 402 and a second radiation area 404.

Radiation area 402 and radiation area 404 may refer to radial areas, relative to mobile communication device 100, in which the wireless signals that cause EM radiation may emanate. As described above, processor 206 may distinguish and determine the presence of subject 304 in captured area 306. Processor 206 may be configured to further determine an EM radiation pattern of the multi-elements antenna array of wireless communication component 202. In determining the EM radiation pattern, processor 206 may be configured to calculate a plurality of adjustable weighting coefficients. By adjusting the weight coefficients, processor 206 may control the EM radiation direction to avoid subject 304 and may direct the EM radiation toward radiation area 402 and radiation area 404.

Thus, FIG. 4 shows a top view 400 of the example environment 300 in which reducing EM radiation on people may be implemented, arranged in accordance with at least some embodiments described herein.

Figure 5:
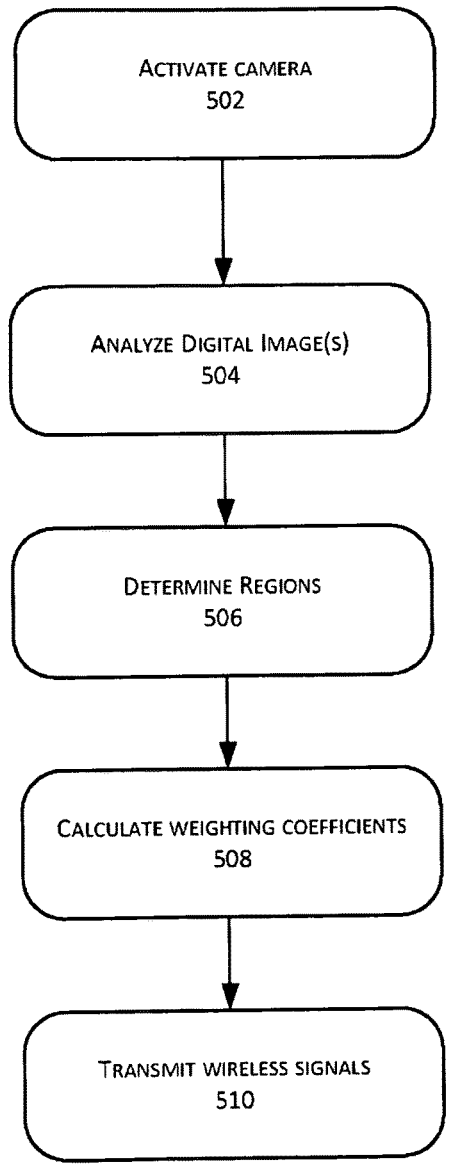
FIG. 5 shows an example configuration of a processing flow of operations by which reduction of EM radiation from a client device may be implemented, arranged in accordance with at least some embodiments described herein.

FIG. 5 shows an example configuration of a processing flow of operations by which reduction of EM radiation from a client device may be implemented, arranged in accordance with at least some embodiments described herein. As depicted, processing flow 500 may include sub-processes executed by various components that are part of example mobile communication device 100. However, processing flow 500 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 500 may include various operation, functions, or actions as illustrated by one or more of blocks 502, 504, 506, 508, and 510. Processing may begin at block 502.

Block 502 (Activate Camera) may refer to processor 206 activating camera 116 on mobile communication device 100 to capture one or more still and/or moving images that include captured area 306. In accordance with some examples, the preset conditions may at least include mobile communication device 100 initiating an outbound wireless transmission or receiving an inbound wireless transmission via wireless communication component 202; mobile communication device 100 terminating a wireless transmission due a degradation in a communication channel used for wireless communication; mobile communication device 100 determining an existence of the degradation in the communication channel; mobile communication device 110 being at a wireless transmission hot spot; and mobile communication device 110 being in an indoor environment. Processing may continue from block 502 to block 504.

Block 504 (Analyze Digital Image(s)) may refer to processor 206 analyzing the digital photographs to detect a presence of one or more people in captured area 306 in the one or more still and/or moving images. In accordance with some examples, the still and/or moving images captured by camera 116 may be transmitted to processor 206. Processor 206 may further convert the captured photographs, if they are not captured as infrared images, into infrared images. The infrared images may be further combined into one or more panoramic images that depict captured area 306. Based on average temperature of people, processor 206 may be configured to detect the presence of one or more people, e.g., subject 304, in captured area 306. Processing may continue from block 504 to block 506.

Block 506 (Determine Regions) may refer to processor 206 determining one or more regions in the captured area 306 in which the presence of one or more subject(s) 304 are detected. Once the one or more subject(s) 304 are detected, processor 206 may determine regions to which the EM radiation may be preferably directed, i.e., away from subject (s) 304. Processing may continue from block 506 to block 508.

Block 508 (Calculate Weighting Coefficients) may refer to processor 206 calculating one or more weighting coefficients that may be used to determine an EM radiation pattern of a multi-element antenna array to avoid directing EM radiation toward the one or more regions in which subject(s) 304 are detected during signal transmission. Processor 206 may be further configured to determine an EM radiation pattern of the multi-elements antenna array of wireless communication component 202 when one or more of subjects 304 are detected in captured area 306. To calculate the EM radiation pattern, processor 206 may be configured to calculate a plurality of weighting coefficients by using a null-forming technique, or a combination of null-forming and beamforming technique. Each weighting coefficient may assign the parameters of the wireless signals, e.g., phase, amplitude, etc., transmitted from one element of a multi-element antenna array so that the overall EM radiation may be directionally controllable. Processing may continue from block 508 to block 510.

Block 510 (Transmit Wireless Signals) may refer to wireless communication component 202 transmitting wireless signals by radiating towards the area in the EM radiation pattern using the weighting coefficients. Wireless communication component 202 may be further configured to transmit wireless signals according to the EM radiation pattern to avoid the regions in which the one or more of subject 304 are detected, once the EM radiation pattern is determined by processor 206.

Thus, FIG. 5 shows an example configuration of a processing flow 500 of operations by which reducing EM radiation on people may be implemented, arranged in accordance with at least some embodiments described herein.

Figure 6:
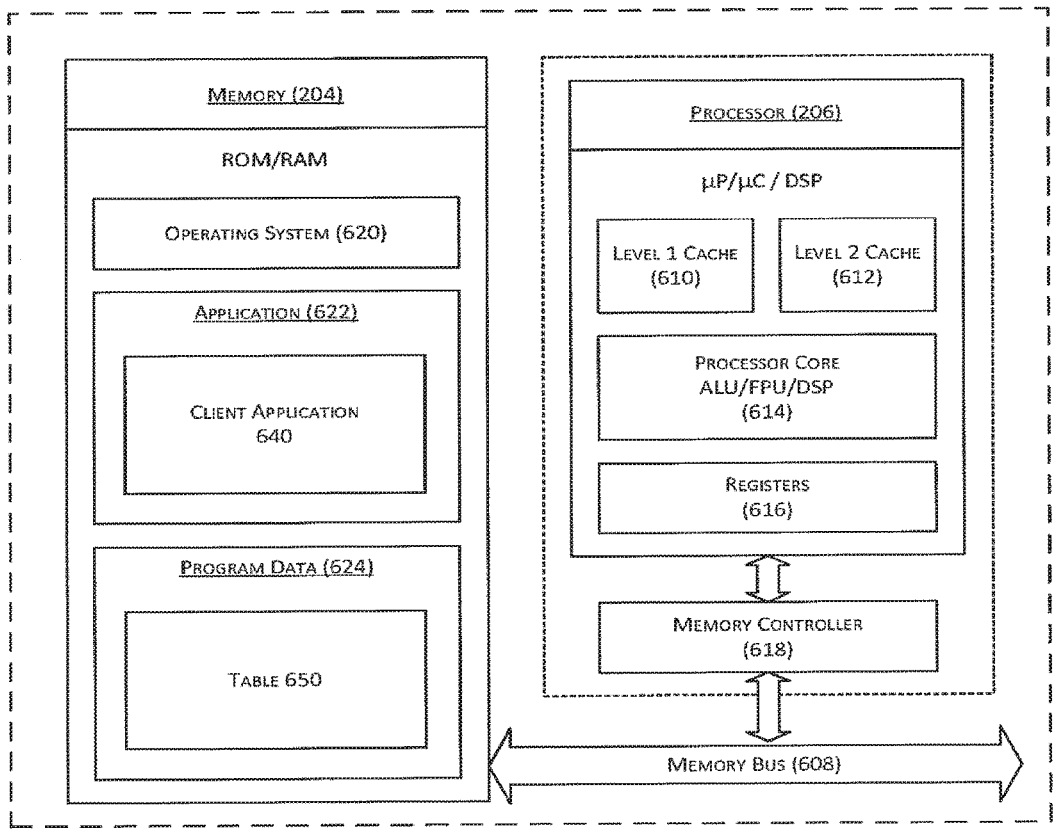
FIG. 6 shows a block diagram illustrating an example computing device that is arranged to implement reduction of EM radiation from a client device, arranged in accordance with at least some embodiments described herein.

FIG. 6 shows a block diagram illustrating an example computing device that is arranged to implement reduction of EM radiation from a client device, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example wireless communication system.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. The processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may be configured to reduce EM radiation on people as described previously with respect to FIGS. 1-5. Program data 624 may include a table 650, which may be useful for reducing RM radiation on people as described herein.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for wireless communication device 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs executing on one or more computers, e.g., as one or more programs executing on one or more computer systems, as one or more programs executing on one or more processors, e.g., as one or more programs executing on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
activating, by a mobile communication device, a camera on the mobile communication device to capture a digital photograph of an area;
analyzing, by the mobile communication device, the digital photograph to identify a presence of one or more people in the area;
determining, by the mobile communication device, one or more regions in the area in which the presence of one or more people is identified;
calculating, by the mobile communication device, a plurality of weighting coefficients used to determine an electromagnetic (EM) radiation pattern of a multi-element antenna array to avoid EM radiation being directed toward the one or more regions in the area in which the presence of one or more people is identified during signal transmission; and
transmitting, by the mobile communication device, wireless signals by radiating towards the area in the EM radiation pattern using the weighting coefficients.

2. The method as recited in claim 1, wherein the area faces a back side of the mobile communication device which is opposite to a front side of the mobile communication device that faces a user when the user operates the mobile communication device.

3. The method as recited in claim 1, wherein the activating comprises activating in response to one or more of a plurality of conditions comprising:
the mobile communication device initiating an outbound wireless transmission with the mobile communication device;
the mobile communication device receiving an inbound wireless transmission through the mobile communication device;
a wireless transmission being terminated due to a degradation in a communication channel used for wireless communication by the mobile communication device;
the mobile communication device determining an existence of the degradation in the communication channel used for wireless communication by the mobile communication device;
the mobile communication device being at a wireless transmission hot spot; and the mobile communication device being in an indoor environment.

4. The method as recited in claim 1, wherein the analyzing the digital photograph to identify a presence of one or more people in the area comprises:
   converting the digital photograph of the area into an infrared photograph depicting a thermal image of the area; and
   analyzing the thermal image of the area to identify the presence of one or more people in the area.

5. The method as recited in claim 1, wherein the calculating a plurality of weighting coefficients used to determine an EM radiation pattern comprises calculating the plurality of weighting coefficients used to determine the EM radiation pattern using a null-forming technique.

6. The method as recited in claim 5, wherein the null-forming technique comprises a Bartlett beamformer technique, a Capon beamformer technique, a Multiple Signal Classification (MUSIC) technique, a Propagator technique, a variation thereof, or a combination thereof.

7. The method as recited in claim 1, wherein the transmitting wireless signals by radiating in the EM radiation pattern comprises transmitting the wireless signals at an increased level of power relative to a level of power at which signals are transmitted without using the EM radiation pattern.

8. The method as recited in claim 1, wherein the transmitting wireless signals by radiating in the EM radiation pattern comprises transmitting the wireless signals using a combination of a beamforming technique and a null-forming technique.

9. The method as recited in claim 1, wherein the transmitting wireless signals by radiating in the EM radiation pattern comprises transmitting the wireless signals by selectively using the EM radiation pattern.

10. A method, comprising:
    obtaining, by a mobile communication device, data representative of an image of an area;
    identifying, by the mobile communication device, one or more regions in the area;
    computing, by the mobile communication device, an electromagnetic (EM) radiation pattern of a multi-element antenna array to avoid EM radiation being directed toward the identified one or more regions in the obtained image during signal transmission; and
    transmitting, by the communication device, wireless signals by radiating in the EM radiation pattern.

11. The method as recited in claim 10, wherein the obtaining data comprises obtaining the data using a camera on a back side of a mobile communication device, and wherein a front side of the mobile communication device opposite to the back side faces a user when the user operates the mobile communication device.

12. The method as recited in claim 10, wherein the obtaining data comprises obtaining the data using a mobile communication device in response to one or more of a plurality of conditions comprising:
    the mobile communication device initiating an outbound wireless transmission with the mobile communication device;
    the mobile communication device receiving an inbound wireless transmission through the mobile communication device;
    a wireless communication signal strength falls below a predetermined threshold value;
    the mobile communication device determining an existence of the degradation in the communication channel used for wireless communication by the mobile communication device;
    the mobile communication device being at a wireless transmission hot spot; and
    the mobile communication device being in an indoor environment.

13. The method as recited in claim 10, wherein the obtaining data representative of an image of an area comprises capturing a digital photograph of the area using a mobile communication device equipped with a camera.

14. The method as recited in claim 13, wherein the obtaining data representative of an image of an area further comprises:
    converting the digital photograph of the area into an infrared photograph depicting a thermal image of the area.

15. The method as recited in claim 10, wherein the identifying one or more regions in the area comprises identifying one or more shapes indicating a presence of one or more people in the area.

16. The method as recited in claim 1, wherein the computing an EM radiation pattern of a multi-element antenna array comprises computing the EM radiation pattern using a null-forming technique.

17. A mobile communication device, comprising:
    a casing having a back side and a front side opposite to the back side;
    a camera exposed on the back side of the casing;
    a user interface unit having an interface for receiving user input on the front side of the casing;
    a wireless communication component configured to wirelessly receive and transmit signals;
    a memory disposed in the casing and configured to store a set of instructions; and
    a processor disposed in the casing and coupled to the camera, the user interface unit and the wireless communication component, the processor configured to:
    activate the camera to capture a digital photograph of an area facing the back side of the casing; and
    activate the wireless communication component to transmit wireless signals by radiating out of the back side of the casing in an electromagnetic (EM) pattern such that no EM radiation is directed toward one or more people located in the area of the captured digital photograph.

18. The mobile communication device as recited in claim 17, wherein the processor is further configured to carry out operations comprising:
    analyzing the digital photograph to identify a presence of the one or more people in the area;
    determining one or more regions in the area in which the presence of one or more people is identified;
    calculating a plurality of weighting coefficients used in determining the EM radiation pattern of a multi-element antenna array to avoid directing the EM radiation toward the one or more regions during signal transmission; and
    activating the wireless communication component to transmit wireless signals by radiating in the EM radiation pattern using the weighting coefficients.

19. The mobile communication device as recited in claim 17, wherein the activating comprises activating in response to one or more of a plurality of conditions comprising:
    the mobile communication device initiating an outbound wireless transmission with the mobile communication device;

the mobile communication device receiving an inbound wireless transmission through the mobile communication device;

a wireless transmission being terminated due to a degradation in a communication channel used for wireless communication by the mobile communication device;

the mobile communication device determining an existence of the degradation in the communication channel used for wireless communication by the mobile communication device;

the mobile communication device being at a wireless transmission hot spot; and the mobile communication device being in an indoor environment.

20. The mobile communication device as recited in claim 17, wherein the analyzing the digital photograph to identify a presence of one or more people in the area comprises:

converting the digital photograph of the area into an infrared photograph depicting a thermal image of the area; and analyzing the thermal image of the area to identify the presence of one or more people in the area.

21. The mobile communication device as recited in claim 17, wherein the calculating a plurality of weighting coefficients used in determining an EM radiation pattern comprises calculating the plurality of weighting coefficients used in determining the EM radiation pattern using a null-forming technique.

22. The mobile communication device as recited in claim 17, wherein the activating the wireless communication component to transmit wireless signals by radiating in the EM radiation pattern comprises activating the wireless communication component to transmit the wireless signals at an increased level of power relative to a level of power at which signals are transmitted without using the EM radiation pattern.

23. The mobile communication device as recited in claim 17, wherein the activating the wireless communication component to transmit wireless signals by radiating in the EM radiation pattern comprises activating the wireless communication component to transmit the wireless signals using a combination of a beamforming technique and a null-forming technique.

24. The mobile communication device as recited in claim 17, wherein the activating the wireless communication component to transmit wireless signals by radiating in the EM radiation pattern comprises activating the wireless communication component to transmit the wireless signals by selectively using the EM radiation pattern.

\* \* \* \* \*

UNITED STATES PATENT AND TRADEMARK OFFICE
CERTIFICATE OF CORRECTION

PATENT NO. : 9,525,449 B2  
APPLICATION NO. : 14/390624  
DATED : December 20, 2016  
INVENTOR(S) : Yin Page 1 of 1

It is certified that error appears in the above-identified patent and that said Letters Patent is hereby corrected as shown below:

On the Title Page

In Item (71), under "Applicant", in Column 1, Line 1, delete "Xuefeng Yin, Shanghai (CN)" and insert -- EMPIRE TECHNOLOGY DEVELOPMENT LLC, Wilmington, DE (US) --, therefor.

In the Specification

In Column 1, Line 8, delete "§371" and insert -- § 371 --, therefor.

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*